(12) United States Patent
Van Vessem et al.

(10) Patent No.: US 11,548,767 B2
(45) Date of Patent: Jan. 10, 2023

(54) LIFTING TOOL (71) Applicant: IHC HOLLAND IE B.V., Sliedrecht (NL)

(72) Inventors: Henricus Gerardus Andreas Van Vessem, Vught (NL); Boudewijn Casper Jung, Bergen op Zoom (NL); Albertus Knol, Numansdorp (NL); Griffin Lorens Hendrik Stuip, Rotterdam (NL)

(73) Assignee: IQIP HOLDING B.V., Sliedrecht (NL)

( * ) Notice: Subject to any disclaimer, the term of this patent is extended or adjusted under 35 U.S.C. 154(b) by 266 days.

(21) Appl. No.: 17/049,267

(22) PCT Filed: Apr. 17, 2019

(86) PCT No.: PCT/NL2019/050223
§ 371 (c)(1),
(2) Date: Oct. 20, 2020

(87) PCT Pub. No.: WO2019/209103
PCT Pub. Date: Oct. 31, 2019

(65) Prior Publication Data
US 2021/0253403 A1 Aug. 19, 2021

(30) Foreign Application Priority Data
Apr. 23, 2018 (NL) ...................................... 2020809

(51) Int. Cl.
*B66C 1/54* (2006.01)
*B66C 1/10* (2006.01)

(52) U.S. Cl.
CPC ................ *B66C 1/54* (2013.01); *B66C 1/108* (2013.01)

(58) Field of Classification Search
CPC .................................. B66C 1/54; B66C 1/108
See application file for complete search history.

(56) References Cited

U.S. PATENT DOCUMENTS

| 5,306,062 A | 4/1994 | Dodge |
| 2018/0127245 A1 | 5/2018 | Belder et al. |

FOREIGN PATENT DOCUMENTS

| DE | 131550 A1 | 7/1978 |
| DE | 102011011603 A1 | 8/2012 |
| WO | 2016184905 A1 | 11/2016 |

OTHER PUBLICATIONS

International Search Report and Written Opinion of the International Searching Authority dated Jun. 8, 2019, for corresponding International Patent Application No. PCT/NL2019/050223, filed Apr. 17, 2019.

*Primary Examiner* — Moshe Wilensky
(74) *Attorney, Agent, or Firm* — Steven M. Koehler; Westman, Champlin & Koehler, P.A.

(57) ABSTRACT

A lifting tool for lifting an element of an offshore structure, such as a transition piece of an offshore wind turbine comprises a frame and a plurality of engagement members for engaging an element to be lifted. The engagement members are mounted to the frame at an angular distance from each other about a centerline of the frame. The lifting tool also comprises a hoisting member to be connected to a hoisting cable of a crane, and located within a virtual cylinder on which the engagement members lie. The hoisting member and the frame are interconnected rigidly through at least three linear actuators which are arranged such that the hoisting member is movable with respect to the frame in a plurality of radial directions with respect to the centerline, independently from the engagement members.

13 Claims, 10 Drawing Sheets

LIFTING TOOL

CROSS-REFERENCE TO RELATED APPLICATION

This Application is a Section 371 National Stage Application of International Application No. PCT/NL2019/050223, filed Apr. 17, 2019 and published as WO 2019/209103 on Oct. 31, 2019, in English.

BACKGROUND

The present invention relates to a lifting tool for lifting an element of an offshore structure, such as a transition piece of an offshore wind turbine.

Most offshore wind turbines use a monopile foundation on which a transition piece is placed. The turbine and its tower are mounted onto the transition piece. Transition pieces are being lifted by connecting a lifting tool to a hoisting cable of a crane, on the one hand, and to the transition piece, on the other hand. It is important to align the lifting tool with the center of gravity of the transition piece. Otherwise the transition piece may suspend inclined from the hoisting cable of a crane and/or the transition piece may start swinging upon lifting it. The same effect may happen with other elements to be lifted.

SUMMARY

A lifting tool quickly and accurately aligns with the center of gravity of an element to be lifted. The lifting tool comprises a frame, a plurality of engagement members for engaging an element to be lifted, which engagement members are mounted to the frame at an angular distance from each other about a centerline of the frame, a hoisting member to be connected to a hoisting cable of a crane, and located within a virtual cylinder on which the engagement members lie. The hoisting member and the frame are interconnected rigidly through at least three linear actuators which are arranged such that the hoisting member is movable with respect to the frame in a plurality of radial directions with respect to the centerline, independently from the engagement members.

An advantage of the invention is that the position of the hoisting member can be adjusted with respect to the frame in different radial directions. The invention provides the opportunity to control the alignment in an automatic way by operating the individual linear actuators. This works quickly and is also safe since operators can stay away from the lifting tool upon aligning the lifting tool. The lifting tool may be provided with sensors to measure acceleration/motion, position, gravity, vibration, pressure, etc. in order to facilitate automatically aligning and positioning in horizontal and vertical direction. The relative position of the hoisting member may be adjusted before starting a hoisting action on the basis of a calculated or measured center of gravity of an element to be lifted.

The rigid interconnection allows to guide a pushing force between the frame and the hoisting member, which is different from a cable connection, for example, which cannot guide a pushing force. Under operating conditions the centerline of the frame is directed upwardly or substantially vertical and the engagement members may lie in a horizontally oriented plane. The centerline of the frame may coincide with a centerline of the virtual cylinder.

Preferably, the actuators are coupled to the frame at the engagement members in order to minimize any distance between an engagement member and a location of the frame on which a hoisting force is exerted.

The hoisting member may be located above the frame under operating conditions of the lifting tool.

In a particular embodiment the hoisting member and the frame are interconnected through three linear actuators which are positioned at equiangular distance about the hoisting member when the hoisting member is located at the centerline. This arrangement provides the opportunity to move the hoisting member in all radial directions with respect to the centerline, which avoids the need to position the lifting tool at a predetermined rotational position with respect to the element to be lifted.

Each of the linear actuators may be pivotally mounted to the hoisting member through a first pivot and pivotally mounted to the frame through a second pivot.

In a particular embodiment each of the linear actuators extends substantially perpendicular to the centerline, wherein the first pivot and the second pivot have respective pivot axes which extend substantially parallel to the centerline. This is a rather simple and robust structure.

Alternatively, the linear actuators may form a tripod. A hexapod structure may be conceivable, as well.

In practice the linear actuators may comprise hydraulic cylinders.

The engagement members may be provided with respective supporting elements including upwardly directed supporting surfaces for engaging cooperating lifting plates of an element to be lifted, wherein the frame is provided with a driving device for rotating the lifting tool with respect to an element to be lifted so as to move the supporting elements to a position below the lifting plates. In this case, the supporting elements of the lifting tool and the lifting plates of an element to be lifted form a bayonet coupling.

The driving device may be formed by a drivable driving wheel which is movable in radial direction of the centerline in order to engage and disengage the driving wheel to and from a tube of the element to be lifted when the element to be lifted is provided with a tubular portion.

The supporting elements may be directed to the centerline of the frame such that they can engage outwardly directed lifting plates of an element to be lifted. Such outwardly directed lifting plates are advantageous when the element to be lifted is a transition piece of an offshore wind turbine, for example, since the upper side of a transition piece is often provided with a protection lid for temporarily protecting devices in the transition piece. When outwardly directed lifting plates are applied the protection lid can stay on the transition piece during a hoisting action.

The lifting tool may be provided with an alignment apparatus, which comprises a camera that is positioned such that a view line of the camera extends in the same direction as the centerline of the frame, and a control device for receiving and processing a signal from the camera, which is configured such that, when a transition piece is to be mounted to a monopile by the lifting tool and the transition piece approaches the monopile, the control device determines at least two circumferential images of the monopile along its length on the basis of the camera signal, for example an upper edge and a lower edge of the monopile, and respective imaginary circumferential images having fixed positions at different locations along the view line of the camera and shows the images to an operator via a user interface. The operator may be a crane driver who does not have direct view on the monopile. The crane driver can move the lifting tool including the transition piece such that the circumferential images of the monopile and the imaging circumferential images are moved to each other in order to align the transition piece and the monopile.

BRIEF DESCRIPTION OF THE DRAWINGS

Aspects of the invention will hereafter be elucidated with reference to the schematic drawings showing embodiments of the invention by way of example.

DETAILED DESCRIPTION OF ILLUSTRATIVE EMBODIMENTS

Figure 1:
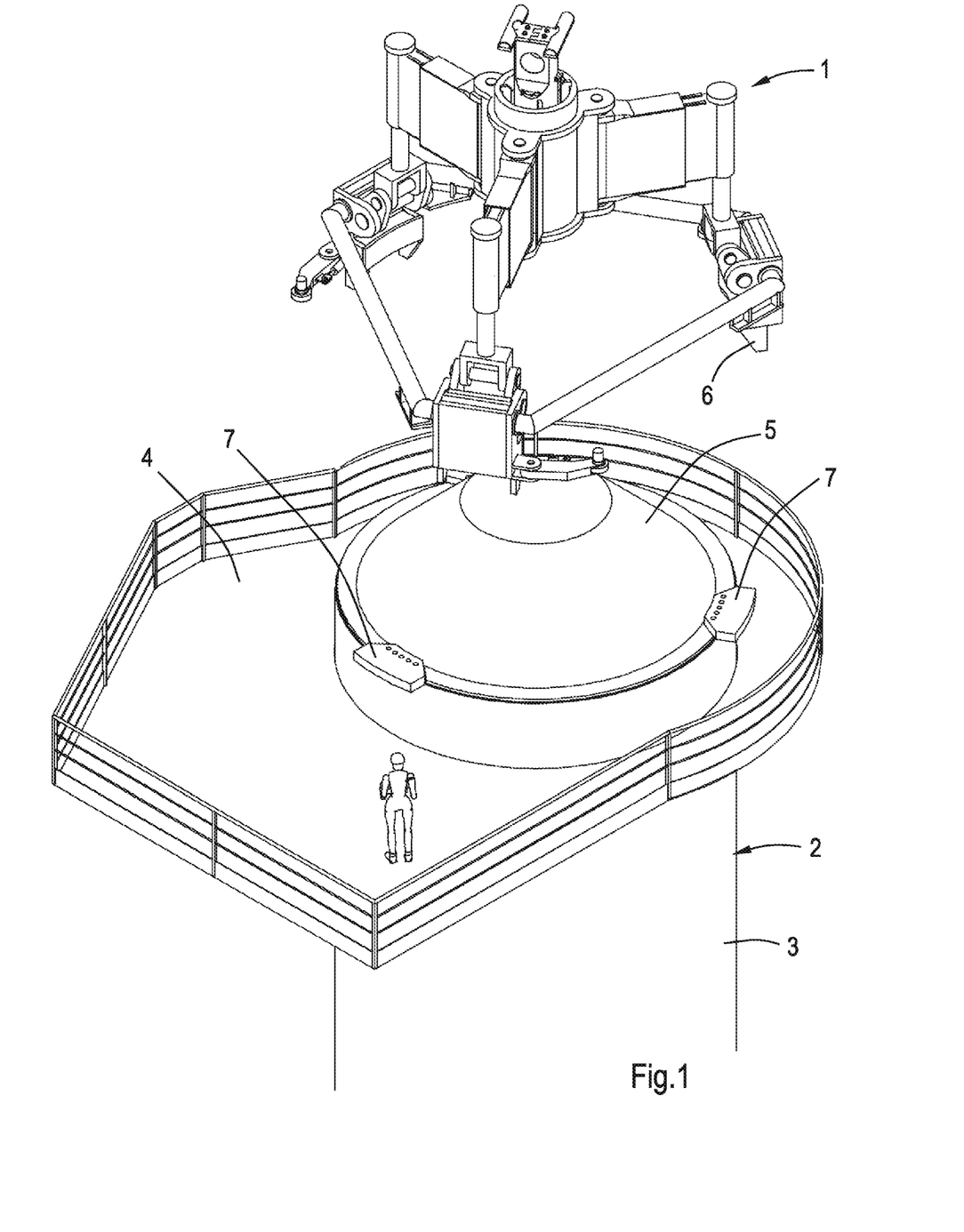
FIG. 1 is a perspective view of an embodiment of a lifting tool.

FIG. 1 shows an embodiment of a lifting tool 1. The lifting tool 1 is suitable for lifting an element of an offshore structure, such as a transition piece 2 of a wind turbine, or lifting another elongated member including a flange. The transition piece 2 comprises a tubular element 3 which can be mounted onto a monopile that is fixed to the sea bottom, for example. The transition piece 2 is provided with a working platform 4 that is fixed to the tubular element 3. The tubular element 3 has an upper end which is covered by a protection lid 5 for temporarily protecting devices (not shown) in the tubular element 3. Such devices are intended for use during the operational time of a wind turbine and are already placed inside the transition piece 2 before it is actually placed off shore. More in general terms, the element to be lifted is a tubular element which comprises a removable protection lid for closing the tubular element.

After installing the transition piece 2 at its intended location the protection lid 5 can be removed and a pedestal of a wind turbine can be mounted onto the transition piece 2. The lifting tool 1 is provided with three engagement members 6 which can engage lifting plates 7 that are fixed to the upper end of the tubular element 3. The engagement members 6 and the lifting plates 7 are coupled to each other via a bayonet coupling in this case. The lifting plates 7 project in outward direction from the transition piece 2. This means that the protection lid 5 can stay on the transition piece 2 during a hoisting action.

Figure 2:
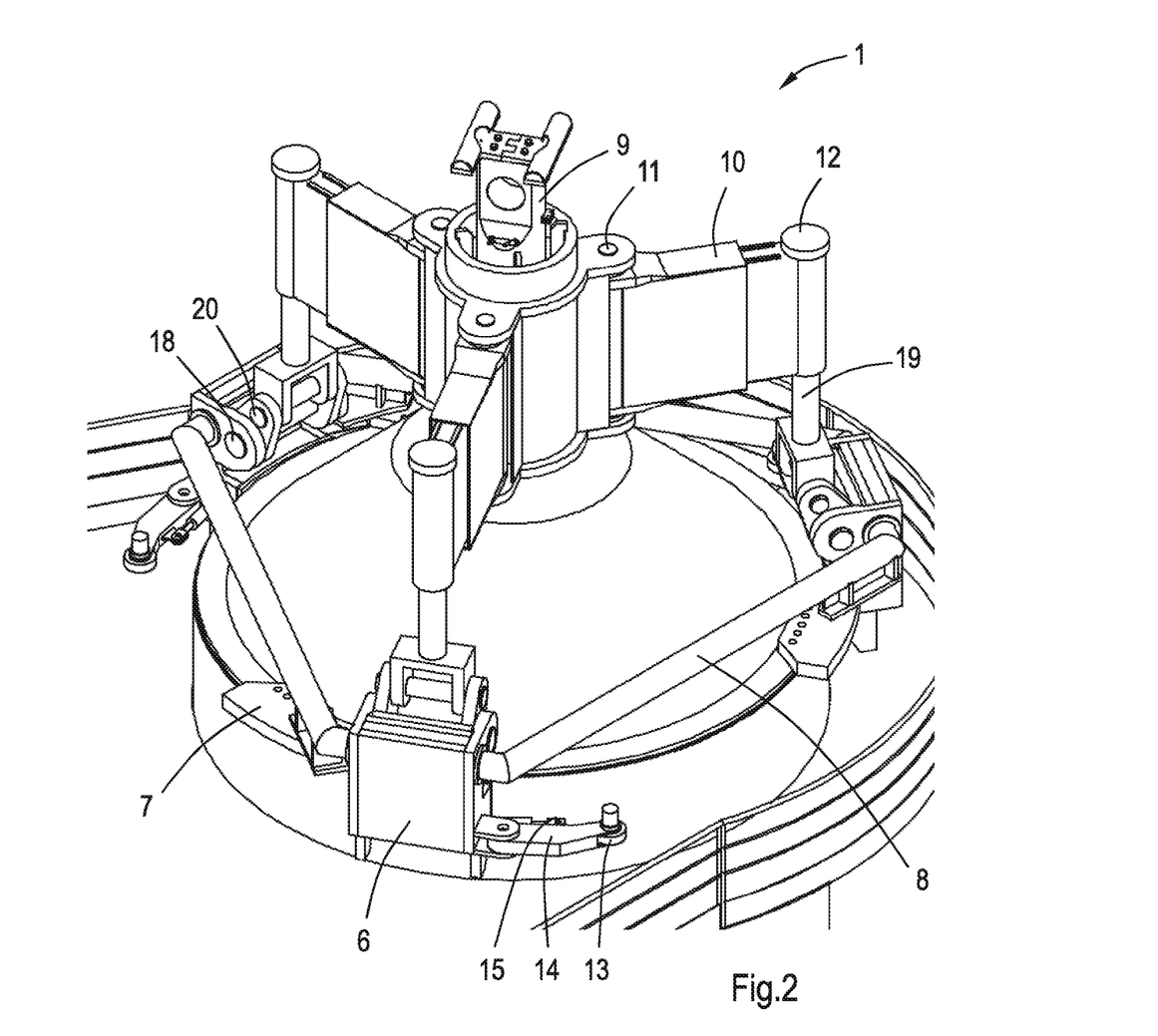
FIG. 2 is a similar view of the embodiment of FIG. 1 on a larger scale.

FIG. 2 shows the lifting tool 1 in more detail. The lifting tool 1 comprises a frame 8 to which the engagement members 6 are mounted. The frame 8 lies in a main plane which is oriented horizontally under operating conditions. The engagement members 6 are located on a virtual cylinder which has a centerline perpendicular to the horizontally oriented main plane of the frame 8. The lifting tool 1 is also provided with a hoisting member 9 that can be connected to a hoisting cable of a crane (not shown) via a hoisting eye in the hoisting member 9. In the embodiment as shown the hoisting member 9 is located above the frame 8 under operating conditions of the lifting tool 1.

In the embodiment as shown in FIG. 2 the hoisting member 9 and the frame 8 are interconnected through three linear actuators in the form of hydraulic cylinders 10 which are pivotally mounted to the hoisting member 9 via respective first pivots 11 including respective pivot axes that extend perpendicular to the main plane of the frame 8. The hydraulic cylinders 10 extend perpendicular to the centerline of the virtual cylinder and form a rigid connection between the hoisting member 9 and the frame 8. The first pivots 11 are located at equiangular distance about the hoisting member 9. When the hoisting member 9 is located at the centerline of the virtual cylinder the hydraulic cylinders 10 extend radially from the hoisting member 9 at equiangular distance about the hoisting member 9. This condition is shown from above in FIG. 3.

The hydraulic cylinders 10 are also pivotally mounted to the frame 8 via respective second pivots 12 including respective pivot axes that extend parallel to the pivot axes of the first pivots 11. In the embodiment as shown in FIG. 2 the second pivots 12 are located at the engagement members 6. Due to the arrangement of the hydraulic cylinders 10 with respect to the hoisting member 9 and the frame 8 the hoisting member 9 is movable with respect to the frame 8 in all radial directions of the centerline of the virtual cylinder, independent from the engagement members 6. This provides the opportunity to easily move the hoisting member 9 to a location above the center of gravity of the transition piece 2 before lifting it.

Figure 3:
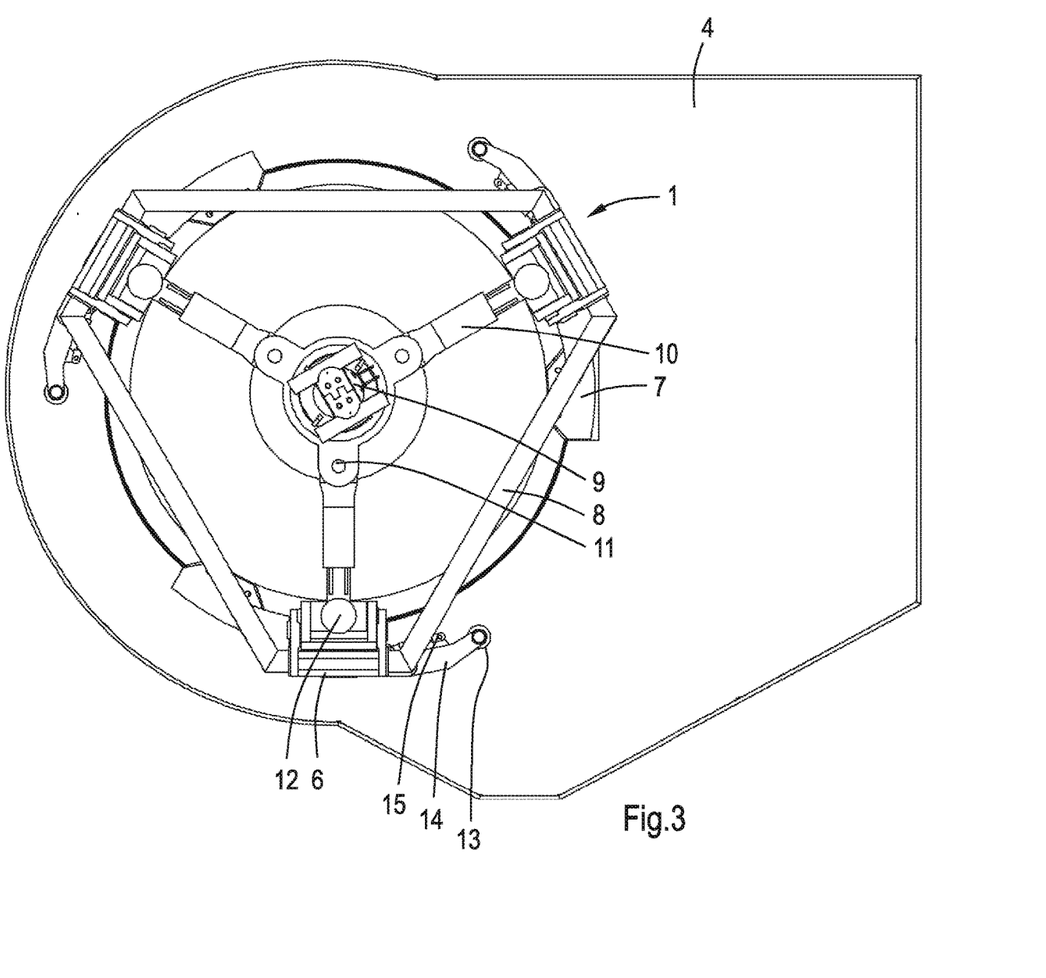
FIG. 3 is a top view of the embodiment of FIG. 1.
Figure 4:
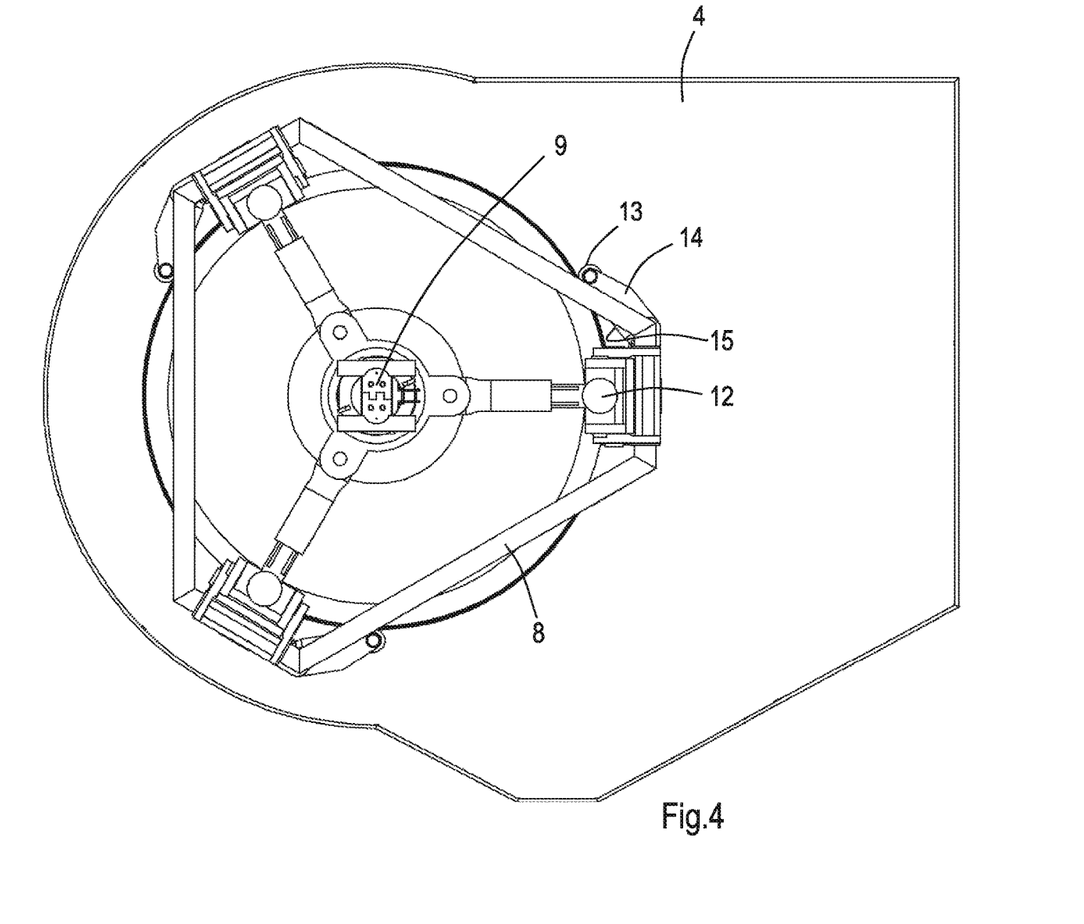
FIGS. 4 and 5 are similar views as FIG. 3, but showing different conditions of the lifting tool.
Figure 6:
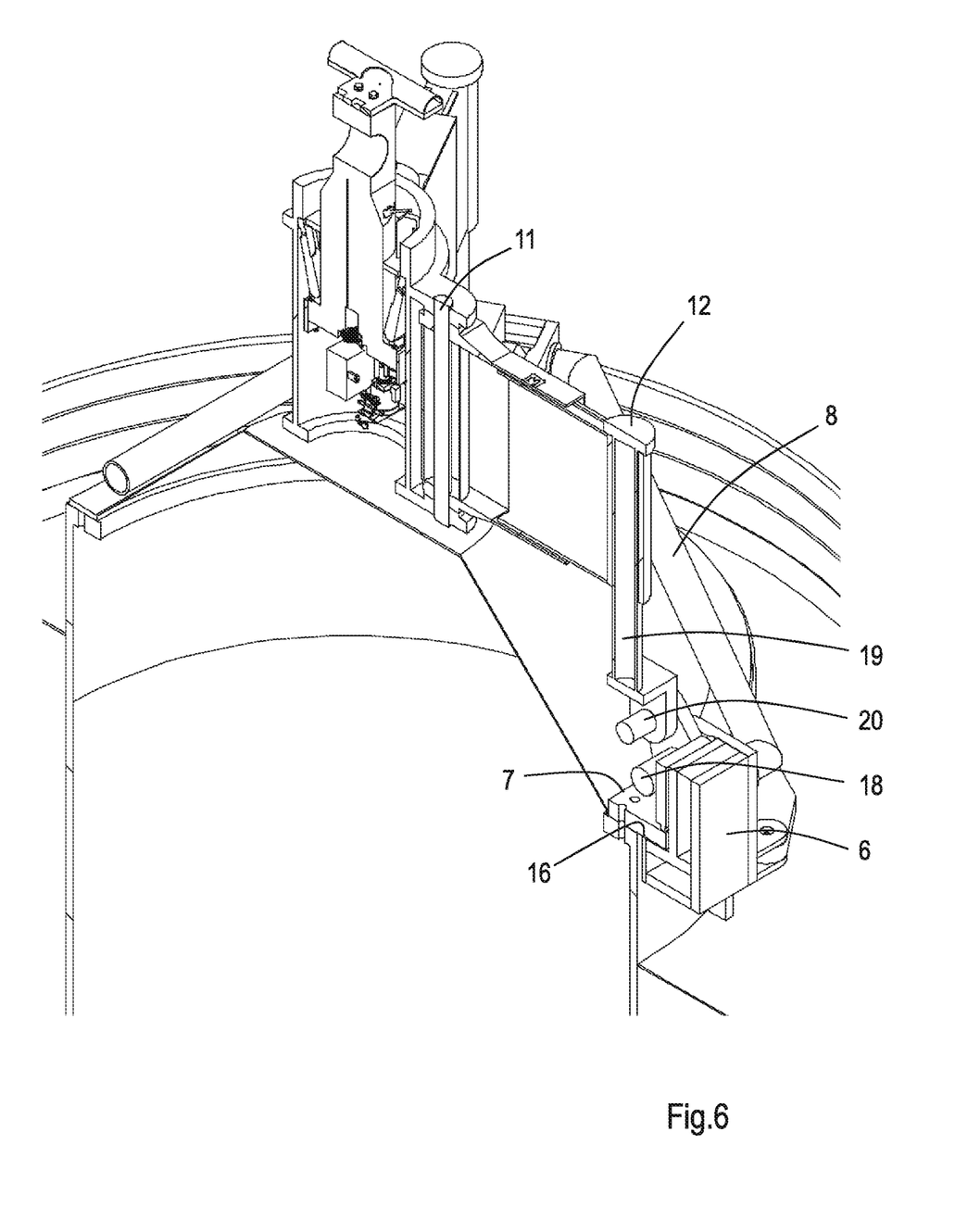
FIG. 6 is a perspective sectional view of the embodiment of FIG. 2.

The lifting tool 1 is provided with driving wheels 13, which are mounted to arms 14 that are pivotally mounted to the frame 8 at the engagement members 6. The arms 14 are driven by hydraulic cylinders 15 such that the driving wheels 13 can be moved to and from the tubular element 3 of the transition piece 2. When driving the driving wheels 13 after contacting the tubular element 3 the lifting tool 1 is rotated with respect to the tubular element 3. The latter condition is shown in FIG. 4, which illustrates that the frame 8 has rotated clockwise with respect to the situation as shown in FIG. 3. During this movement respective upwardly directed supporting surfaces 16 of the engagement members 6 are positioned below the lifting plates 7, hence forming a bayonet coupling. This condition is shown in FIG. 6.

Figure 7:
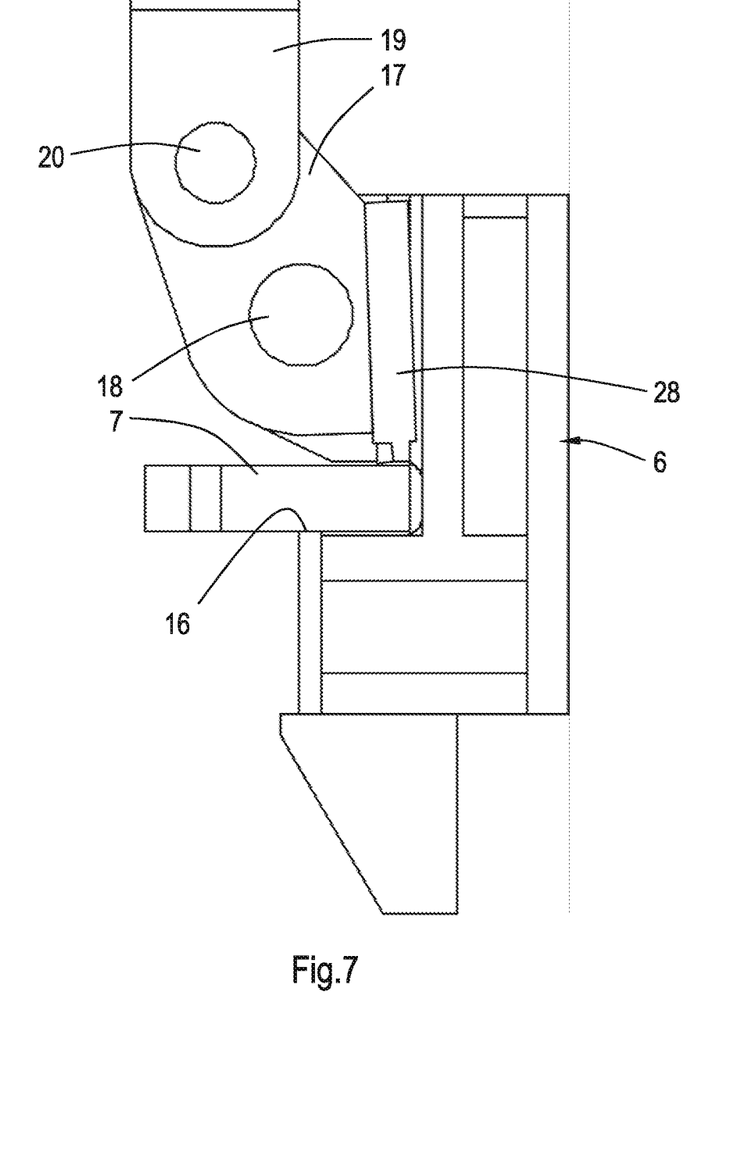
FIG. 7 is a side view of a part of the lifting tool as shown in FIG. 1 on a larger scale.
Figure 8:
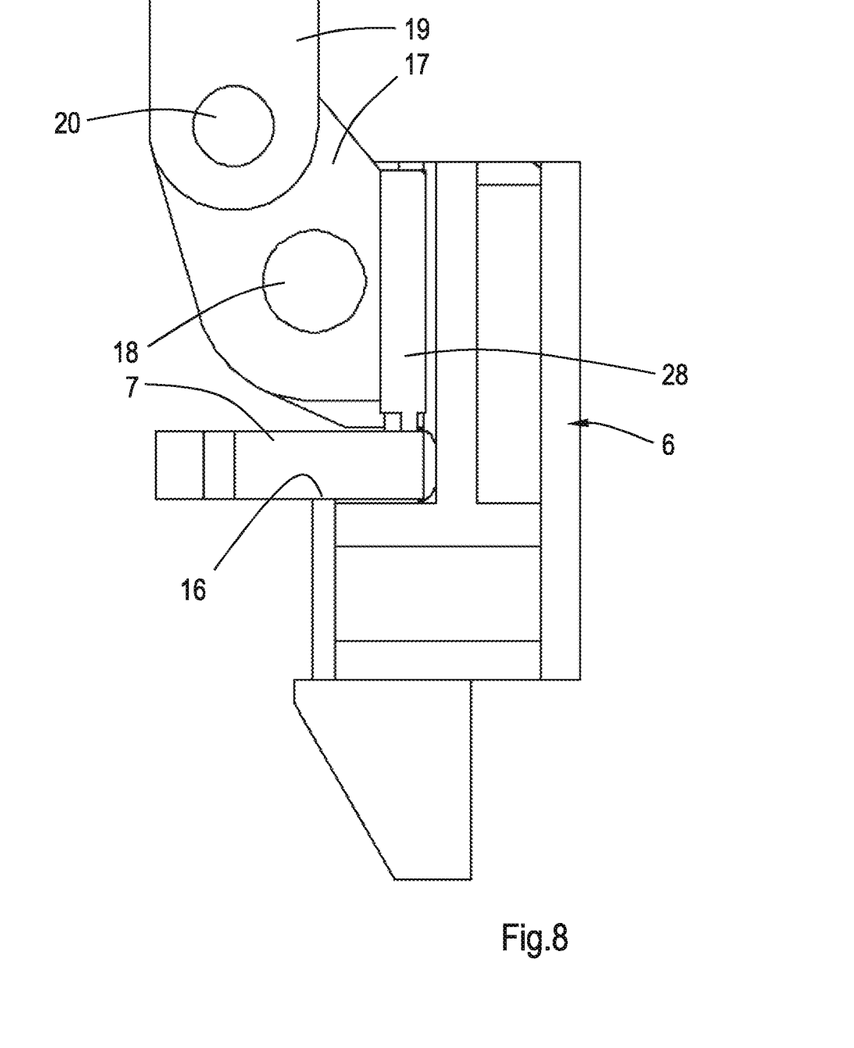
FIG. 8 is a similar view as FIG. 7, but showing a different condition of the lifting tool.

FIGS. 7 and 8 show the operation of the engagement members 6 in more detail. Each of the engagement members 6 is provided with an arm 17 that is pivotally mounted to the frame 8 via a third pivot 18 that has a horizontally oriented pivot axis, on the one hand, and that is pivotally mounted to a vertical shaft 19 of the second pivot 12 via a fourth pivot 20 that also has a horizontally oriented pivot axis, on the other hand. The pivot axes of the fourth pivots 20 lie closer to the hoisting member 9 than the pivot axes of the third pivots 18. Each of the arms 17 is provided with a locking element 28. Upon moving the hoisting member 9 downwardly with respect to the frame 8 the engagement members 6 provide respective openings for receiving the lifting plates 7 due to displacing the locking element 28 upwardly. This condition is shown in FIG. 7. When the hoisting member 9 is moved upwardly with respect to the frame 8, such as illustrated in FIG. 8, the arms 17 tilt such that the lifting plates 7 are clamped between the respective supporting surfaces 16 and downwardly moving locking elements 28. As a consequence, the lifting plates 7 will not bent during hoisting whereas a fixed lifting support during hoisting is achieved. It is noted, that each of the arms 17 is adapted such that it can rotate through the corresponding third pivot 18 by only a limited angle due to abutment of a side of the locking element 28 against an opposite wall at the engagement member 6.

Figure 5:
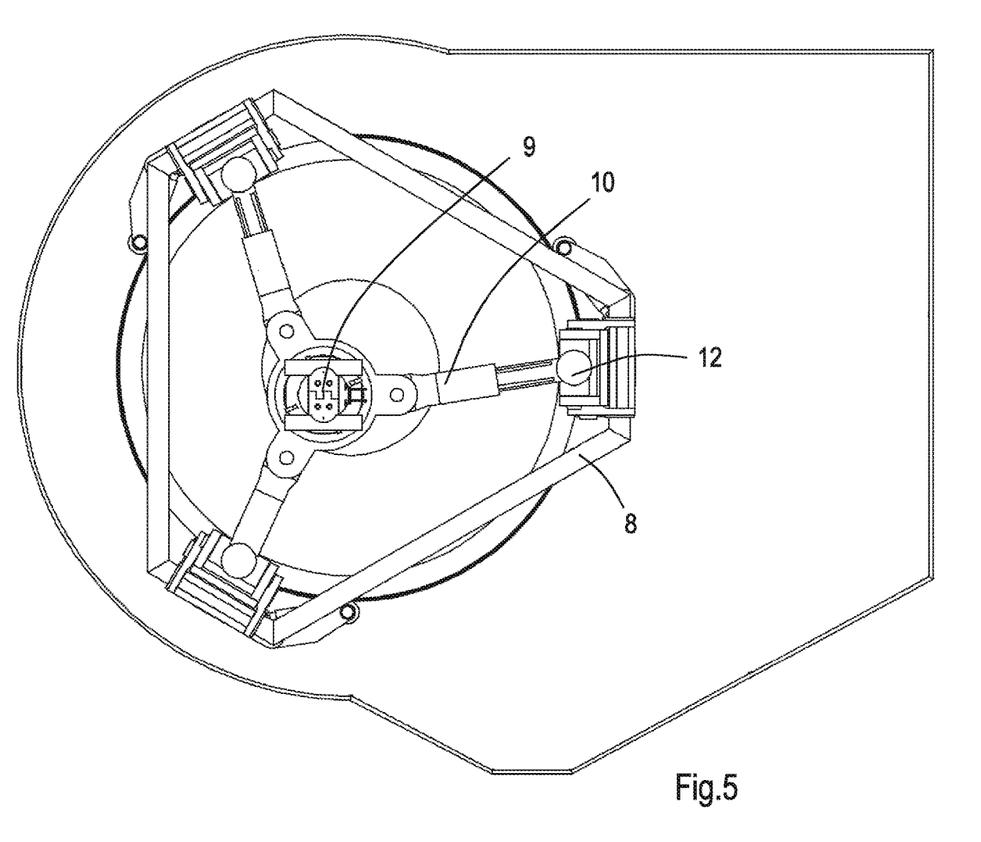

FIG. 5 shows a situation in which the hoisting member 9 is moved with respect to the frame 8, away from the centerline of the virtual cylinder by operating the individual hydraulic cylinders 10. The relative position of the hoisting member 9 may be adjusted before starting a hoisting action on the basis of a calculated or measured center of gravity of the transition piece 2. Alternatively, the relative position of the hoisting member 9 may be adjusted during a hoisting action on the basis of information from sensors on the lifting tool 1 and/or the transition piece 2.

Figure 9:
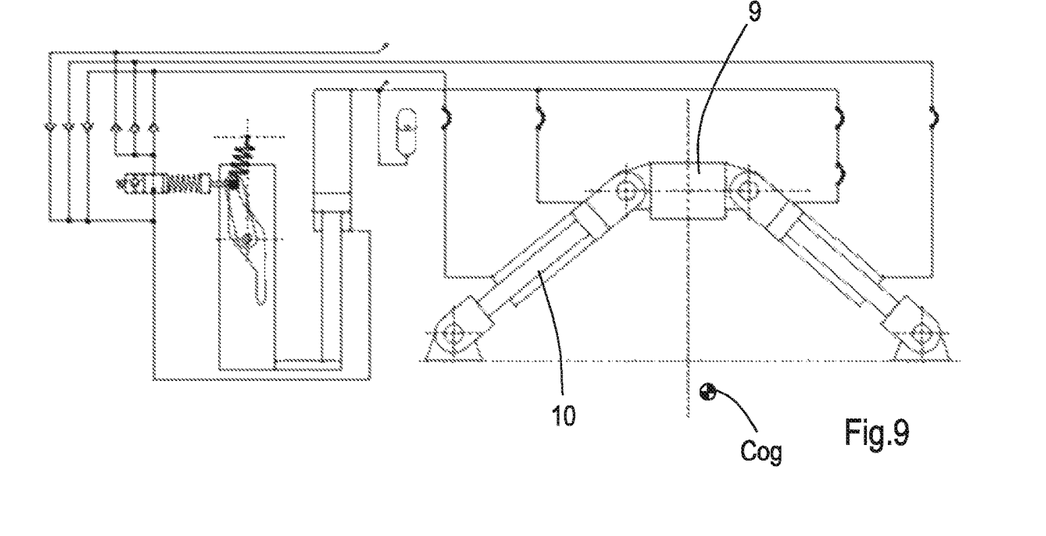
FIG. 9 is a diagrammatic view of an alternative embodiment of the lifting tool.
Figure 10:
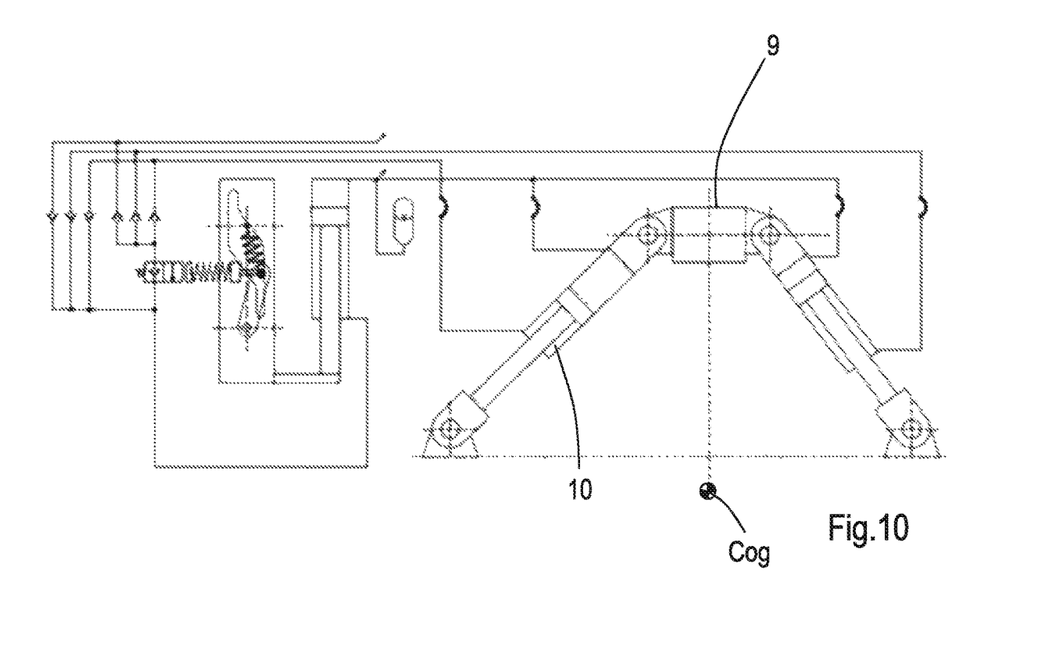
FIG. 10 is a similar view as FIG. 9, but showing a different condition of the lifting tool.

In an alternative embodiment the hydraulic cylinders may form a tripod. FIGS. 9 and 10 show a hydraulic circuit of a tripod configuration, in which two of three hydraulic cylinders 10 are visible. FIG. 9 illustrates a condition in which the hoisting member 9 is located at the centerline of the frame 8, which is out of line with the center of gravity COG of the transition piece 2. FIG. 10 illustrates a condition in which the hydraulic cylinders 10 are operated such that the hoisting member 9 is aligned with the center of gravity COG.

In this embodiment the hydraulic cylinders 10 are connected to each other in order to use the principle of communicating volumes to distribute the oil pressure in the cylinders 10. All three cylinders 10 are identical and are equipped with brakes and double seals in order to make them fail safe. Furthermore, each cylinder 10 has a system for releasing the pressure in order to enable soft landing of the lifting tool 1. The hydraulic lines between the cylinders 10 (for creating communicating volumes) contain valves to enable or disable the flow of oil through the system depending on the required orientation (angle) the transition piece 2 needs to be lifted.

It is noted that under operating conditions the crane hook from which the lifting tool 1 suspends also needs to be vertically aligned with the center of gravity COG in order to make sure that the transition piece 1 will not start swinging upon lifting it.

Figure 11:
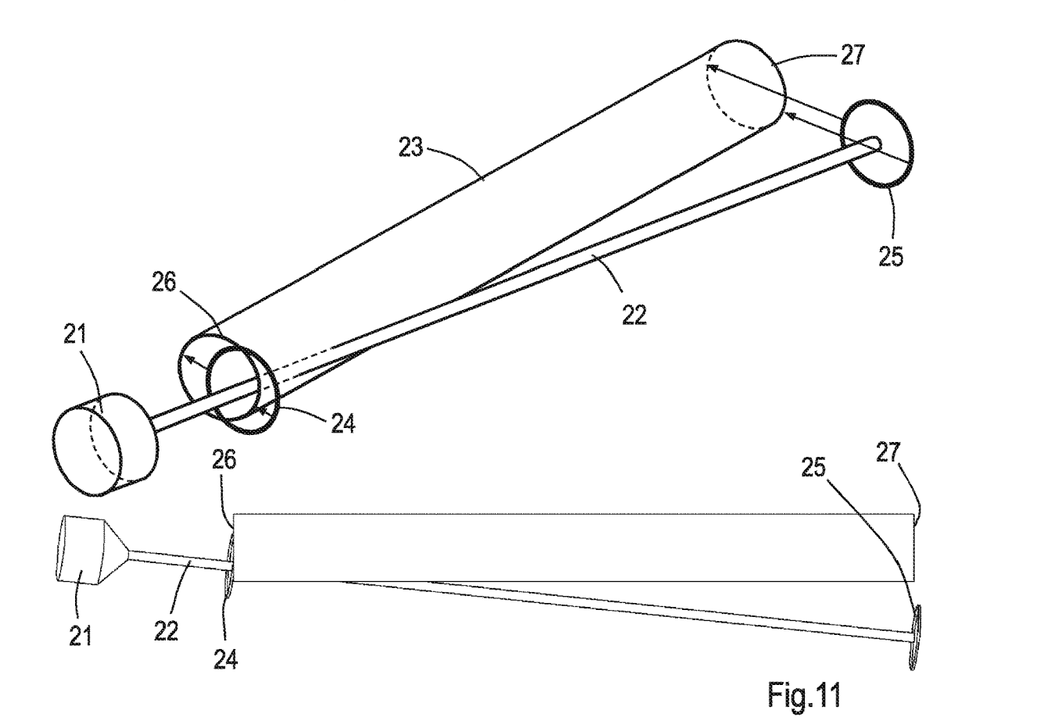
FIG. 11 is an explanatory diagram of the functioning of an alignment apparatus.
Figure 12:
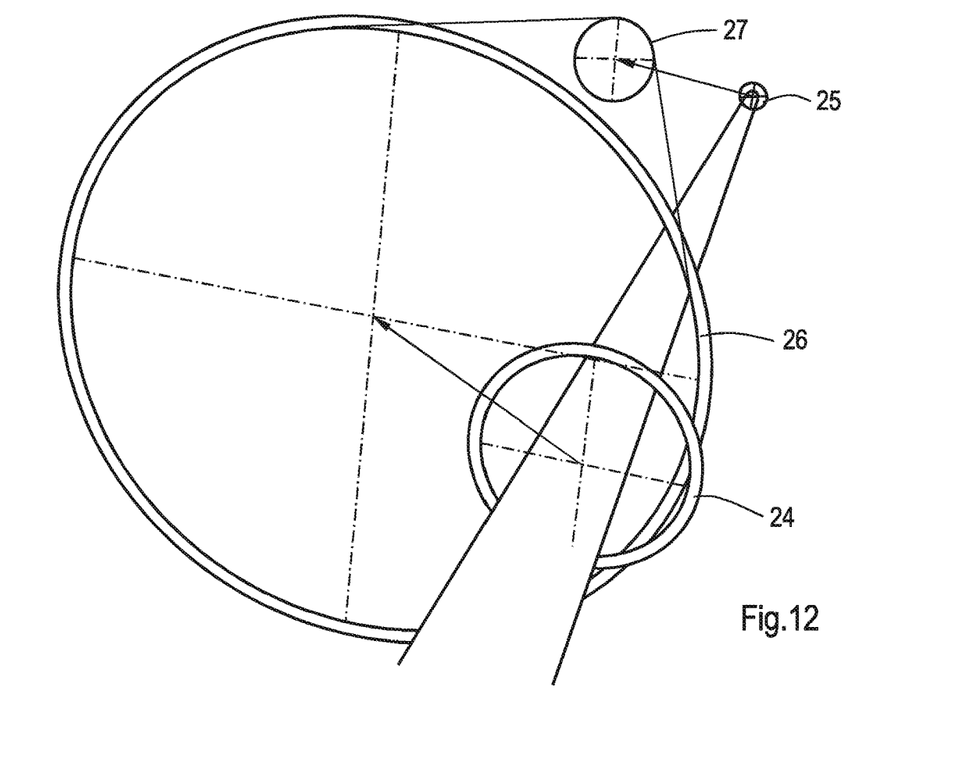
FIG. 12 is a view on a user interface of the alignment apparatus.

In order to safely and accurately mount the transition piece 2 on a monopile the lifting tool 1 may be provided with an alignment apparatus including a camera 21 and a control device (not shown). FIG. 11 illustrates the functioning of the alignment apparatus. The camera 21 may be located on the frame 8 of the lifting tool 1. It is positioned such that a view line 22 of the camera 21 extends in the same direction as the centerline of the frame 8. FIG. 11 only illustrates the functioning of the camera 21 and the control device in general without showing the lifting tool 1, the transition piece 2 and the monopile, but a tube 23 in FIG. 11 may be considered as being a monopile. FIG. 11 shows that along the view line 22 of the camera 21 there are a front imaginary circumferential image 24 and a rear imaginary circumferential image 25. Both front and rear imaginary circumferential images 24, 25 have different positions along the view line 22 and are generated by the control device. When a transition piece 2 is to be mounted to a monopile by the lifting tool 1 and approaches the monopile, the camera 21 also detects a front circumferential image 26 and a rear circumferential image 27 of the monopile. In practice the front and rear circumferential images 26, 27 may correspond to an upper rim and a lower rim of the monopile, but other locations along the tube 23 are conceivable. The control device shows the detected and generated images 24-27 to a crane driver via a user interface (not shown), for example a mobile phone. FIG. 12 shows an example of the images as can be seen by the crane driver. On the basis of these images the crane driver can adjust the position and orientation of the transition piece 2 such that the front imaginary circumferential image 24 and the front circumferential image 26, on the one hand, and the rear imaginary circumferential image 25 and the rear circumferential image 27, on the other hand, form concentric circles, such that the transition piece 2 and the monopile are aligned. It is noted that in this case the monopile or tube 23 have circular cross sections, hence resulting in concentric circles, but alternative shapes are conceivable.

The control device may be provided with software for calculating the required movements needed by the crane driver in order to facilitate to obtain concentricity of the images. Since the crane driver can align the transition piece 2 and the monopile without the necessity of human assistance at the monopile the work can be done in a safe way.

More in general, the invention is also related to a method of aligning a member, for example a lifting tool, with respect to an elongated element, for example a monopile, wherein a camera is mounted to the member to be aligned, wherein the camera is positioned such that its view extends along a view line that, after aligning, substantially coincides with a centerline of the elongated member, wherein the member including the camera is located at a position at or close to an end of the elongated element in which position the elongated element is visible by the camera, such that the camera detects at least two circumferential images of the elongated element located at different locations in longitudinal direction thereof, for example an upper rim and a lower rim of the elongated element, wherein at least two imaginary circumferential images at different positions along the view line of the camera are generated, wherein the member to be aligned and the elongated element are displaced and oriented with respect to each other such that the centers of the imaginary circumferential images substantially coincide with the centers of the circumferential images of the elongated element. The invention is also related to an alignment apparatus that applies this method.

The invention is not limited to the embodiments shown in the drawings and described hereinbefore, which may be varied in different manners within the scope of the claims and their technical equivalents.

The invention claimed is:

1. A lifting tool for lifting an element of an offshore structure, comprising:
   a frame,
   a plurality of engagement members for engaging an element to be lifted, which engagement members are mounted to the frame at an angular distance from each other about a centerline of the frame,
   a hoisting member to be connected to a hoisting cable of a crane, and located within a virtual cylinder on which the engagement members lie,
   at least three linear actuators rigidly interconnecting the hoisting member and the frame, wherein the at least three linear actuators are arranged the frame, wherein the at least three linear actuators which are arranged such that the hoisting member is movable with respect to the frame in a plurality of radial directions with respect to the centerline, independently from the engagement members.

2. The lifting tool according to claim 1, wherein the at least three linear actuators are coupled to the frame at the engagement members.

3. The lifting tool according to claim 1, wherein the hoisting member is located above the frame under operating conditions of the lifting tool.

4. The lifting tool according to claim 1, wherein the hoisting member and the frame are interconnected through the at least three linear actuators which are positioned at equiangular distance about the hoisting member when the hoisting member is located at the centerline.

5. The lifting tool according to claim 4, wherein each of the at least three linear actuators is pivotally mounted to the hoisting member through a first pivot and pivotally mounted to the frame through a second pivot.

6. The lifting tool according to claim 5, wherein each of the at least three linear actuators extends substantially perpendicular to the centerline, wherein the first pivot and the second pivot have respective pivot axes which extend substantially parallel to the centerline.

7. The lifting tool according to claim 4, wherein the at least three linear actuators form a tripod.

8. The lifting tool according to claim 1, wherein the at least three linear actuators comprise hydraulic cylinders.

9. The lifting tool according to claim 1, wherein the engagement members are provided with respective supporting elements including upwardly directed supporting surfaces for engaging cooperating lifting plates of the element to be lifted, wherein the frame is provided with a driving device configured to rotate the lifting tool with respect to the element to be lifted so as to move the supporting elements to a position below the lifting plates.

10. The lifting tool according to claim 9, wherein the driving device is formed by a drivable driving wheel which is movable in a radial direction of the centerline.

11. The lifting tool according to claim 9, wherein the supporting elements are directed to the centerline of the frame.

12. The lifting tool according to claim 1, wherein the lifting tool is provided with an alignment apparatus which comprises a camera that is positioned such that a view line of the camera extends in a same direction as the centerline of the frame, and a control device configured to receive and process a signal from the camera, which is configured such that, when a transition piece is to be mounted to a monopile by the lifting tool and the transition piece approaches the monopile, the control device determines at least two circumferential images of the monopile along its length on a basis of the signal from the camera, and generates respective imaginary circumferential images having fixed positions at different locations along the view line of the camera and shows the images to an operator via a user interface.

13. The lifting tool according to claim 1, wherein the element to be lifted is a tubular element which comprises a removable protection lid for closing the tubular element.

* * * * *